United States Patent [19]
Helfrich

[11] Patent Number: 5,779,541
[45] Date of Patent: Jul. 14, 1998

[54] COMBINE YIELD MONITOR

[76] Inventor: Jim C. Helfrich, 747 Millegan Rd., Great Falls, Mont. 59504

[21] Appl. No.: 720,880

[22] Filed: Oct. 3, 1996

[51] Int. Cl.⁶ .............................. A01F 12/46; A01F 12/50
[52] U.S. Cl. ...................... 460/6; 56/10.2 R; 56/DIG. 15
[58] Field of Search .............................. 460/6, 1, 4, 7; 56/10.2 R, DIG. 15

[56] References Cited

U.S. PATENT DOCUMENTS

| | | | |
|---|---|---|---|
| 3,638,659 | 2/1972 | Dahlquist et al. | 56/DIG. 15 X |
| 5,318,475 | 6/1994 | Schrock et al. | 460/6 X |
| 5,480,354 | 1/1996 | Sadjadi | 460/7 |

*Primary Examiner*—Terry Lee Melius
*Attorney, Agent, or Firm*—Richard C. Conover

[57] ABSTRACT

A combine yield monitor replacing a portion of a conventional cross-auger moving grain through a combine. The monitor having a housing which has an opening through a bottom wall of the housing. The yield monitor further including an auger, rotatably mounted within the housing, having a screw blade and connected to the cross-auger to replace a portion of the cross-auger. The auger having a portion of the screw blade removed intermediate the ends to form an accumulation volume for momentarily stopping grain flow through the auger. The auger further having a portion of the screw blade positioned over the opening to move grain away from over the opening. A load cell located below the opening for measuring the weight of the accumulation volume of grain in the auger.

4 Claims, 4 Drawing Sheets

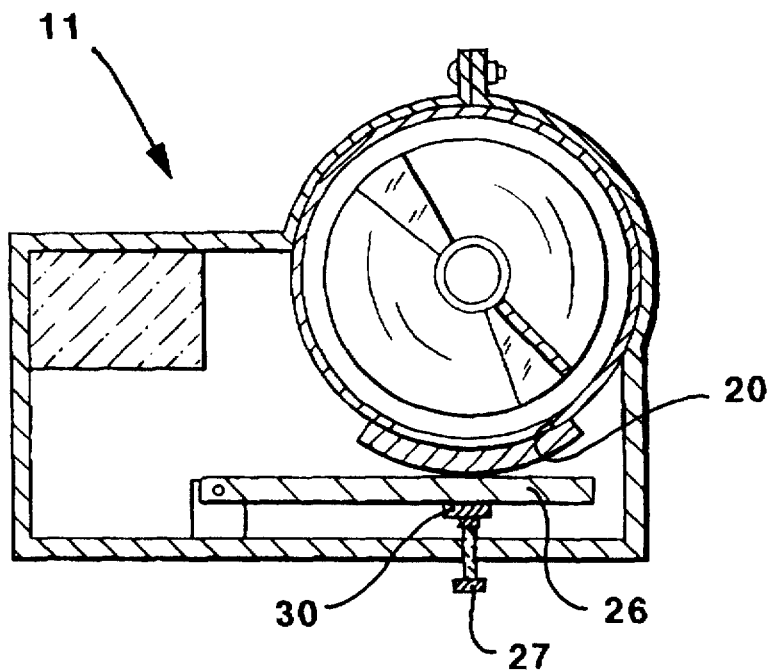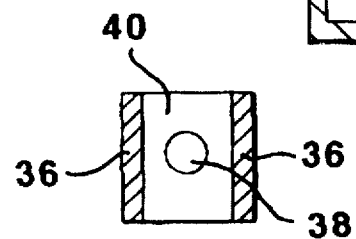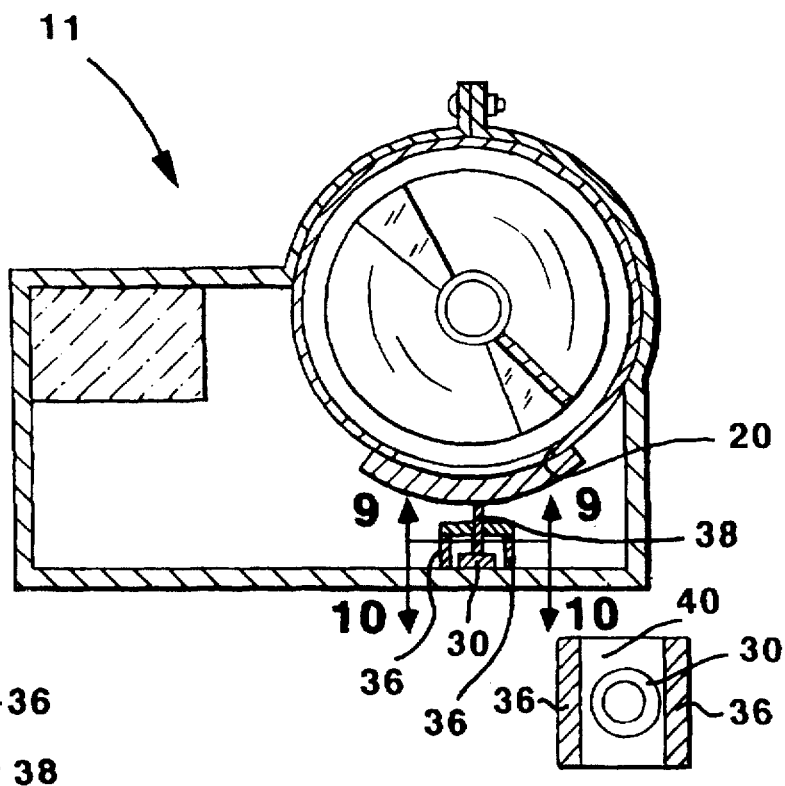

COMBINE YIELD MONITOR

BACKGROUND OF THE INVENTION

This invention relates to an improved yield monitor for use with combines. It is desirable when combining grain in a field to monitor the grain yield at various locations in the field. Using the present invention with location devices such as a Global Positioning System (GPS) receiver, a map of a farmer's field can be generated showing yields for particular locations in the field so that improved fertilizing and planting procedures can be followed to increase the yield.

In the past several patents have described inventions that monitor a flow of grains, or other materials, to provide sensor inputs to a microprocessor. For instance, see U.S. Pat. No. 5,318,475 to Schrock et al. and U.S. Pat. No. 4,765,190 to Strubbe. Other inventors have used various other devices to measure a flow rate, or to perform other tests on grains as they are being harvested. For instance, see U.S. Pat. No. 3,611,252 to DeCoene, U.S. Pat. No. 3,606,745 to Girodat, U.S. Patent Behnke et al., and U.S. Pat. No. 5,173,079 to Gerrish. None of these patents, provide a way of mechanically varying the flow of grain to give instantaneous indications as to variations in weight of grain being harvested. These variations are important however, because the variations can be mapped to the field being harvested to provide important data as to fertilization, moisture, planting densities, insect damage, etc.

From the above, it can be seen that a mechanical method of varying the grain flow to match the instantaneous harvest rate so as to measure the instantaneous weight of the material being harvested, can be important to farmers.

SUMMARY OF INVENTION

The present invention relates to an improved combine yield monitor device. The apparatus includes an auger insert which replaces a portion of a cross-auger conventionally found in modern combines. The auger of the present invention, having an input end and an output end, is secured in the housing of the conventional cross-auger along a predetermined path of the grain flow. Intermediate the input and output ends, the present auger insert has an accumulation volume set aside, which is a gap in the auger, so as to provide an accumulation space to momentarily check grain movement. The downstream portion of the auger, that portion adjacent the downstream end of the accumulation space, can then move grain out of the accumulation space at the same rate the grain is being harvested.

Adjacent the output end, the present invention has an opening in the bottom of the housing. A weight pad is placed under the opening to prevent grain material and dust from flowing through the opening. Underneath the opening, a load arm is mounted on a fulcrum in a lever fashion so that the weight of the grain on the load arm rotates the load arm. A load sensor, pressed by the load arm at the other end of the arm, is used to measure the weight of grain above the opening in the housing of the auger insert.

In a second and third embodiment, the weight of the grain over the opening is measured directly without using a lever arm.

In any of the three embodiments, the instantaneous weight of grain being harvested can be determined and used as an input with other devices, such as a Global Positioning System readout of field position, to map variations in grain yield.

BRIEF DESCRIPTION OF THE DRAWINGS

In order that the invention may be clearly understood and readily carried into effect, preferred embodiments of the invention will now be described by way of example with reference to the accompanying drawings:

FIG. 7 is a second embodiment of the invention in the same cross-sectional view as FIG. 4;

FIG. 8 is a third embodiment of the invention in the same cross-sectional view as FIG. 4;

FIG. 9 is a cross-sectional view of the third embodiment taken along the line 9—9 in FIG. 8 with background parts broken away; and FIG. 10 is a cross-sectional view of the third embodiment taken along the line 10—10 in FIG. 8 with background parts broken away.

DESCRIPTION OF A PREFERRED EMBODIMENT

Figure 1:
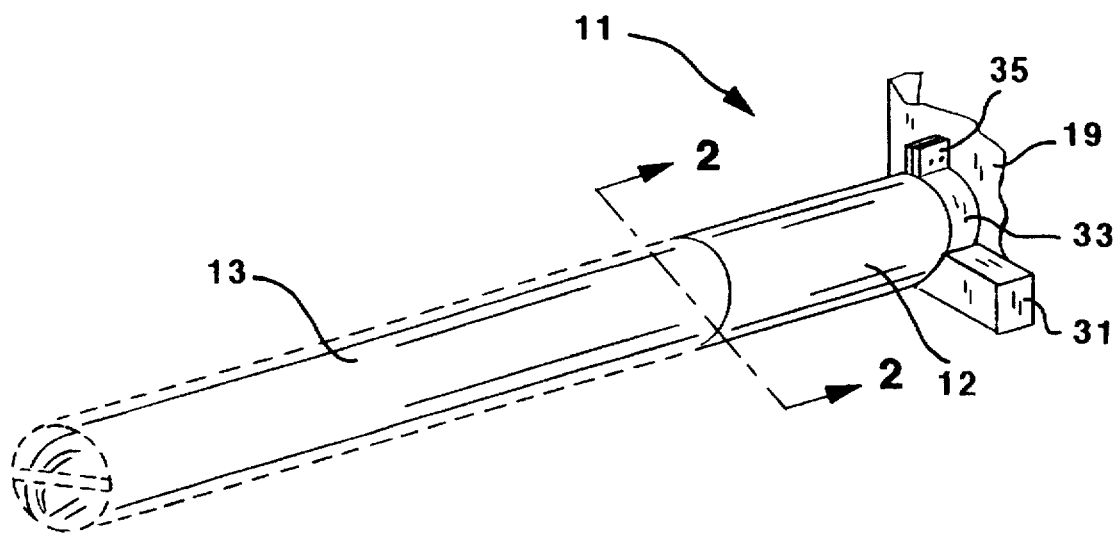
FIG. 1 is a perspective view showing the position of the improved combine yield monitor on a cross-auger of a combine (combine not shown) which empties into a clean grain elevator of the combine.
Figure 2:
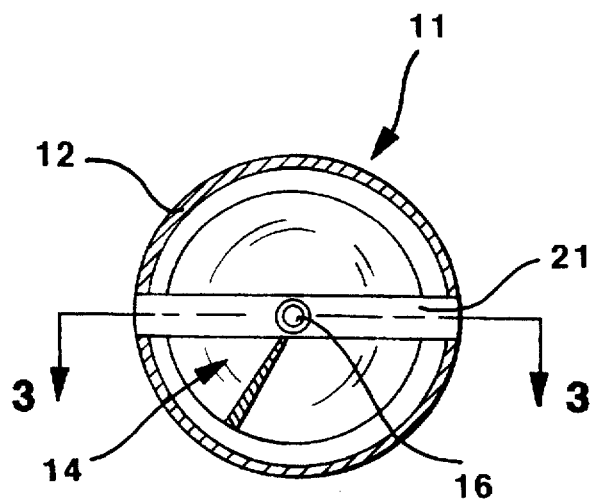
FIG. 2 is an end view of the combine yield monitor taken along the line 2—2 in FIG. 1.
Figure 3:
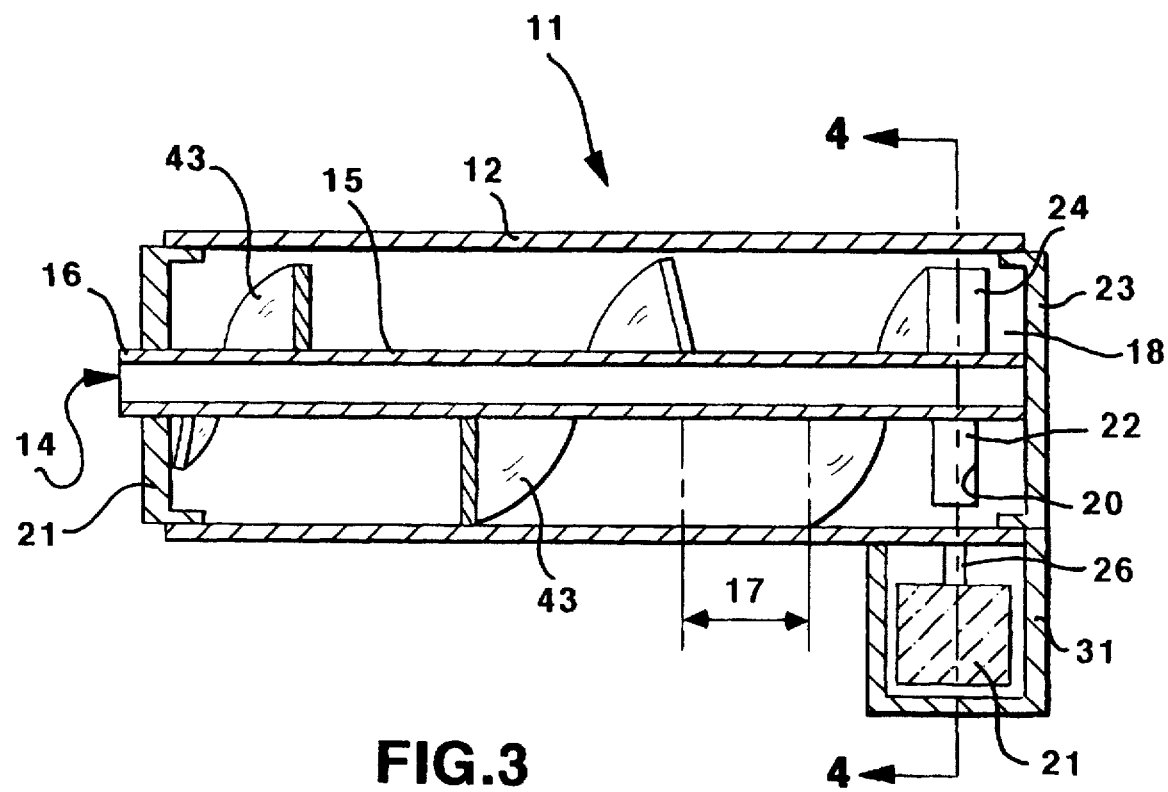
FIG. 3 is a cross-sectional view of the combine yield monitor taken along the line 3—3 in FIG. 2.
Figure 4:
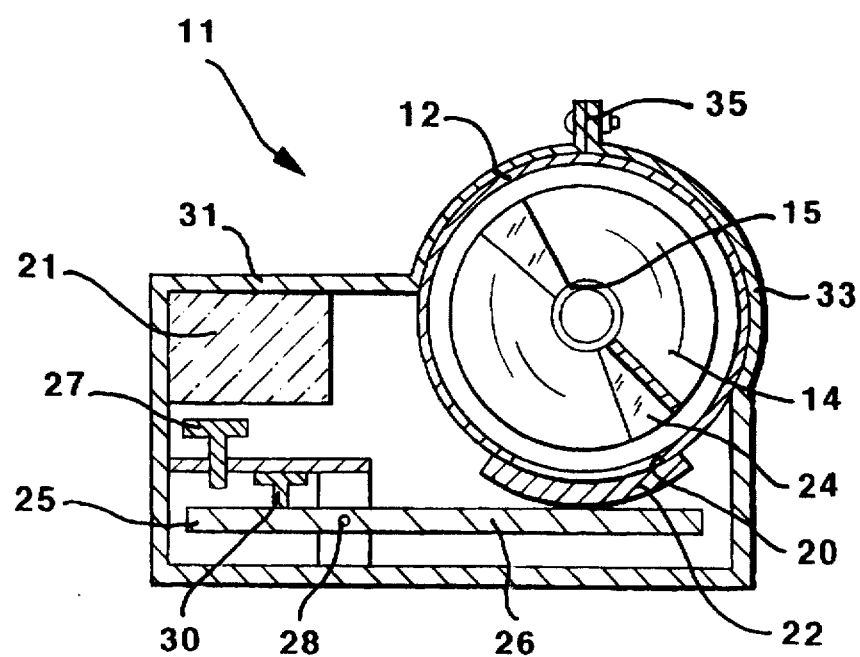
FIG. 4 is a cross-sectional view of the complete cross-section of the combine yield monitor as shown in FIG. 2 at a position shown as line 4—4 in FIG. 3.

A preferred embodiment of the improved yield monitor 11 is shown in FIGS. 1–4. Before this yield monitor can be used, a portion of the combine cross-auger must be removed and combine yield monitor 11 inserted to replace the removed portion. A hollow cylindrical housing 12 housing an auger 14 is shown in FIGS. 2–4. A screw blade 43 of auger 14 is mounted on shaft 15. An end 16 of shaft 15 is connected in line, as by welding, with the conventional cross-auger of a combine (combine not shown). A portion of the auger screw blade 43, shown as distance 17 in FIG. 3, is eliminated to provide an accumulation volume within yield monitor 11. The accumulation volume provides a small space to accept grain flow as the auger is turned.

The other end of auger 14, shown as 18, empties grain moved by the cross-auger and combine yield monitor 11 into a conventional clean grain elevator 19 of a combine as shown in FIG. 1. Further, auger 14 is held in bearing supports 21 and 23 located at each end of housing 12.

Figure 5:
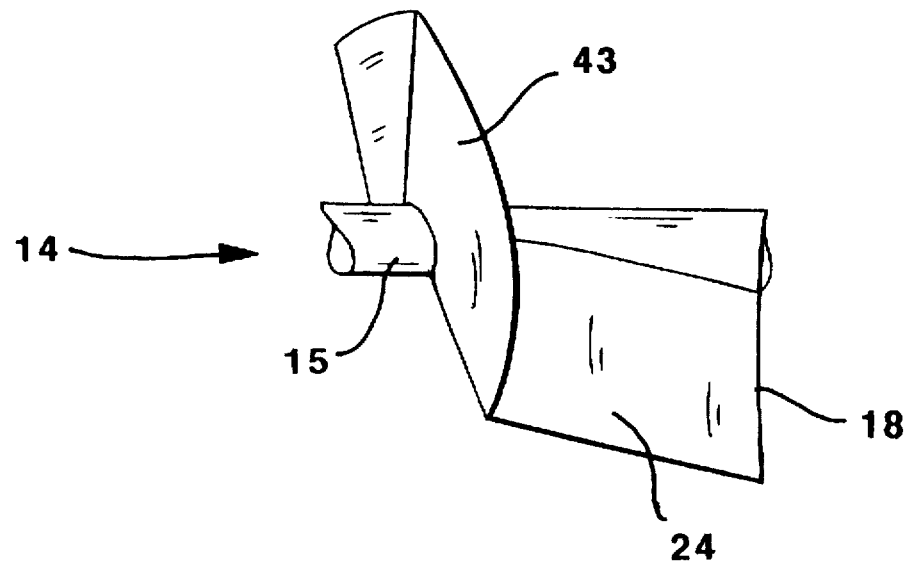
FIG. 5 is a perspective view of a modified auger design used in the combine yield monitor shown in FIG. 3.
Figure 6:
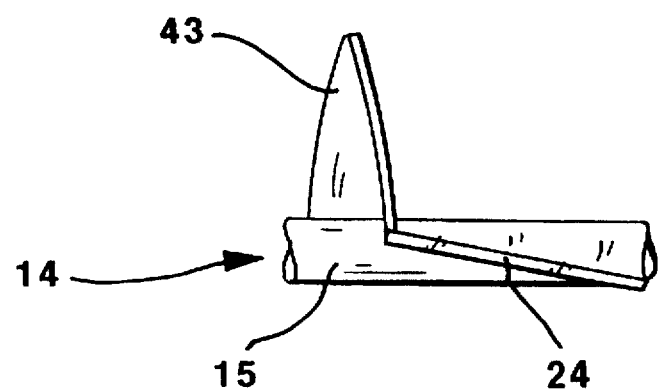
FIG. 6 is a perspective view of the modified auger design shown in FIG. 5 with the auger rotated.

Housing 12 further has an opening 20 located in the bottom of the housing as shown in FIGS. 3 and 4. Auger 14 above the opening is shaped to provide a paddle 24. The shape of this portion of auger 14, and as shown in FIGS. 5 and 6, is used to pick up grain from over opening 20 and move the grain into clean grain elevator 19.

A weight pad 22 is placed beneath opening 20 and connected to a load arm 26 which is pivotally mounted on a fulcrum 28. The end 25 of load arm 26 abuts against a load cell 30. Grain above opening 20 pushes down on load arm 26 forcing end 25 of load arm 26 against load cell 30. Set screw 27 mounted on base plate 29 provides a stop to limit the movement of end 25 of load arm 26.

Load cell 30 provides an electrical signal dependent upon the weight of the grain above opening 20. This signal is transmitted to a data collector 21 shown schematically in FIGS. 3 and 4.

The load arm 26 and load cell 30 are housed in housing 31 which is strapped onto housing 12 of auger 14 with strap 33 and bolt 35.

In a second embodiment of the combine yield monitor 11, the position of three elements is changed. Only those three elements will be referenced in FIG. 7 as all the remaining elements remain as referenced in FIG. 4. Load cell 30 is placed directly beneath opening 20. In this embodiment, load arm 26 is shortened and does not act as a lever against load cell 30, but rather acts as a means for transferring the weight of the grain above opening 20 to the load cell. Set screw 27 is placed directly beneath load cell 30 as shown in FIG. 7 to provide an adjustment in the spacing from opening 20.

In a third embodiment of the combine yield monitor 11, the structure surrounding load cell 30 has again been changed. Only those elements of the structural change will be referenced in FIGS. 8, 9, and 10 as all the remaining elements remain as referenced in FIG. 4. In this embodiment, mounting blocks 36 are attached to housing 31 between the housing and opening 20. The tops of mounting blocks 36 are spaced apart from housing 31 in the direction of opening 20 while the mounting blocks are also individually spaced apart from each other along housing 31. The distances are such as to permit load cell 30 to be attached to housing 31 between the blocks with the tops of the blocks extending above the load cell as shown in FIG. 8.

A shaft 38 extends from weight pad 22 to load cell 30 in this third embodiment. Bushing 40 rests on, and is connected to, the tops of mounting blocks 36. Bushing 40 also has a bore to accept shaft 38. The weight of grain above opening 22 is thus transferred through shaft 38 to load cell 30. In this embodiment, load cell 30 may have internal overload protection to protect against too large a movement by shaft 38.

In operation, when a combine is combining wheat, for example, the combine first cuts the wheat plant and directs the wheat plant to a threshing portion of a combine where the wheat is separated from the chaff. The separated wheat is then directed to cross-auger 13 of the combine for delivery to a clean grain elevator 19. The grain being moved through cross-auger 13 passes into combine yield monitor 11 of the present invention where it moves to accumulator volume 17 to await removal by the downstream portion of auger 14.

The downstream portion of auger 14 picks up the grain from accumulation volume 17 at the same rate the grain is entering the accumulation volume and delivers the grain to just above opening 20. Here the grain rests on weight pad 22. In the preferred embodiment, the weight of the wheat is determined by the weight acting on an end of load arm 26 through opening 20 which in turn is proportionally sensed by load cell 30. In the second and third embodiment, the weight is determined by the weight acting directly upon load cell 30.

Upon further rotation of auger 14, paddle 24 then moves grain from over opening 20 into clean grain elevator 19. Continued rotation of the cross-auger causes additional grain to be moved from accumulator volume 17 to a position over opening 20. This results in a discrete measurement on a continuous basis of the weight of the grain being moved by cross-auger 13. Since the yield monitor device is located within, and is an extension of, the cross-auger, this invention provides a way for determining yield information early in the combining process.

While the fundamental novel features of the invention have been shown and described, it should be understood that various substitutions, modifications and variations may be made by those skilled in the art without departing from the spirit or scope of the invention. Accordingly, all such modifications or variations are included in the scope of the invention as defined by the following claims.

I claim:

1. A combine yield monitor replacing a portion of a conventional cross-auger moving grain along a predetermined path within a cross-auger housing, the combine yield monitor comprising:
    a monitor housing having an input end and an output end and connected to the cross-auger housing and extending along the predetermined path;
    the monitor housing having an opening through a bottom wall of the monitor housing adjacent the output end;
    an auger having a screw blade and connected to the cross-auger to replace a portion of the cross-auger along the predetermined path and rotatably positioned within the monitor housing;
    the auger having a portion of the screw blade removed intermediate the ends to form an accumulation volume;
    the auger further having a portion of the screw blade positioned over the opening to move grain away from over the opening;
    a weight pad covering the opening;
    a load cell; and
    an arm, resting upon a fulcrum, with one end of the arm resting against the weight pad, and the other end of the arm resting against the load cell to transfer a proportionate weight from the weight pad to the load cell.

2. The combine yield monitor of claim 1 further including a set screw, threadably connected to the housing, for adjustably limiting the maximum pressure that can effectively act on the load cell.

3. A combine yield monitor replacing a portion of a conventional cross-auger moving grain along a predetermined path within a cross-auger housing, the combine yield monitor comprising:
    a monitor housing having an input end and an output end and connected to the cross-auger housing and extending along the predetermined path;
    the monitor housing having an opening through a bottom wall of the monitor housing adjacent the output end;
    an auger having a screw blade and connected to the cross-auger to replace a portion of the cross-auger along the predetermined path and rotatably positioned within the monitor housing;
    the auger having a portion of the screw blade removed intermediate the ends to form an accumulation volume;
    the auger further having a portion of the screw blade positioned over the opening to move grain away from over the opening;
    a weight pad covering the opening;
    a load cell; and
    an arm, pivotally connected to the housing at one end, with the other end inserted between the weight pad and the load cell to transfer weight from the weight pad to the load cell.

4. The combine yield monitor of claim 3 further including a set screw, threadably connected to the housing, for adjustably limiting the maximum pressure that can effectively act on the load cell.

* * * * *